(12) United States Patent
Calago et al.

(10) Patent No.: US 11,603,643 B2
(45) Date of Patent: Mar. 14, 2023

(54) COMBINATION TIE DOWN LUG AND STEP RISER

(71) Applicants: ZOOMLION Heavy Industry NA, Inc., Yorkville, WI (US); ZOOMLION Heavy Industry Science and Technology Co. Ltd., Changsha (CN)

(72) Inventors: Edgar Calago, Lake Villa, IL (US); Erik Goslawski, Burlington, WI (US); Hruturaj Vasant Vartak, New Berlin, WI (US)

(73) Assignees: ZOOMLION HEAVY INDUSTRY NA, INC., Yorkville, WI (US); ZOOMLION HEAVY INDUSTRY SCIENCE AND TECHNOLOGY CO. LTD

( * ) Notice: Subject to any disclaimer, the term of this patent is extended or adjusted under 35 U.S.C. 154(b) by 458 days.

(21) Appl. No.: 16/996,979

(22) Filed: Aug. 19, 2020

(65) Prior Publication Data
US 2022/0056666 A1 Feb. 24, 2022

(51) Int. Cl.
*B60R 3/00* (2006.01)
*E02F 9/08* (2006.01)
*B60P 7/08* (2006.01)

(52) U.S. Cl.
CPC .......... *E02F 9/0833* (2013.01); *B60P 7/0807* (2013.01); *B60R 3/00* (2013.01)

(58) Field of Classification Search
CPC ......... E02F 9/0833; B60P 7/0807; B60R 3/00
See application file for complete search history.

(56) References Cited

U.S. PATENT DOCUMENTS

| | | | | |
|---|---|---|---|---|
| 4,109,761 | A * | 8/1978 | Matlock | A63B 27/00 182/92 |
| 4,422,527 | A * | 12/1983 | Schultz | A63B 27/00 182/187 |
| 4,620,610 | A * | 11/1986 | Southard | A63B 27/00 182/228.1 |
| 4,867,272 | A * | 9/1989 | Troubridge | A63B 27/00 182/189 |
| 5,967,720 | A * | 10/1999 | Profit | B60P 7/0807 410/97 |
| 6,145,920 | A * | 11/2000 | Rasmussen | B60P 3/36 410/101 |
| 6,431,315 | B1 * | 8/2002 | Lewis | A63B 27/00 182/136 |
| 8,845,250 | B1 * | 9/2014 | Helms | B60P 7/0807 410/106 |

(Continued)

*Primary Examiner* — Jacob B Meyer
(74) *Attorney, Agent, or Firm* — Donald J. Ersler

(57) ABSTRACT

A combination tie down lug and step riser includes a foot support portion, a hold down loop and a mounting portion. The combination tie down lug and step riser is preferably fabricated from a single piece of material. The foot support portion includes a plurality of projections extending upward from a top edge thereof. The hold down loop extends from one end of the foot rest portion. The hold down loop includes a U-shaped opening with the U-shaped opening positioned along a horizontal axis. The mounting portion extends from an opposing end of the foot support portion. Opposing ends of the hold down loop and the mounting portion are attached to an excavator base with welding or any other suitable attachment method.

8 Claims, 4 Drawing Sheets

(56) References Cited

U.S. PATENT DOCUMENTS

| | | | |
|---|---|---|---|
| 9,409,055 B1* | 8/2016 | Niemela | A63B 27/00 |
| 2005/0199442 A1* | 9/2005 | Stidham | A63B 27/00 |
| | | | 182/92 |
| 2009/0127814 A1* | 5/2009 | McPherson | B60R 3/002 |
| | | | 280/163 |
| 2022/0056666 A1* | 2/2022 | Calago | B60P 3/062 |
| 2022/0144425 A1* | 5/2022 | McCauley | B66C 1/14 |
| 2022/0281548 A1* | 9/2022 | Kaeb | B60R 9/02 |

* cited by examiner

COMBINATION TIE DOWN LUG AND STEP RISER

BACKGROUND OF THE INVENTION

1. Field of the Invention

The present invention relates generally to heavy equipment and more specifically to a combination tie down lug and step riser, which is attached to an excavator base in numerous locations to allow an operator to climb into an excavator cab and to anchor the excavator during transport.

2. Discussion of the Prior Art

It appears that the prior art does not teach or suggest a combination tie down lug and step riser for an excavator.

Accordingly, there is a clearly felt need in the art for a combination tie down lug and step riser, which is attached to an excavator base in numerous locations to allow an operator to climb into an excavator cab and to anchor the excavator during transport.

SUMMARY OF THE INVENTION

The present invention provides a combination tie down lug and step riser, which is attached to an excavator base in numerous locations to allow an operator to climb into an excavator cab and to anchor the excavator during transport. The combination tie down lug and step riser includes a foot support portion, a hold down loop and a mounting portion. The combination tie down lug and step riser is preferably fabricated from a single piece of material. However, the combination tie down lug and step riser 1 may also be fabricated from multiple pieces of material. The foot support portion includes a plurality of projections extending upward from a top edge thereof to engage a shoe of an operator to prevent slippage during entry to the excavator cab or the like. The hold down loop extends from one end of the foot rest portion. The hold down loop includes a U-shaped opening with the U-shaped opening positioned along a horizontal axis. The mounting portion extends from an opposing end of the foot support portion. Opposing ends of the hold down loop and the mounting portion are attached to an excavator base with welding or any other suitable attachment method.

Accordingly, it is an object of the present invention to provide a combination tie down lug and step riser, which is attached to an excavator base in numerous locations to allow an operator to climb into an excavator cab and to anchor the excavator during transport.

These and additional objects, advantages, features and benefits of the present invention will become apparent from the following specification.

DETAILED DESCRIPTION OF THE PREFERRED EMBODIMENTS

Figure 1:
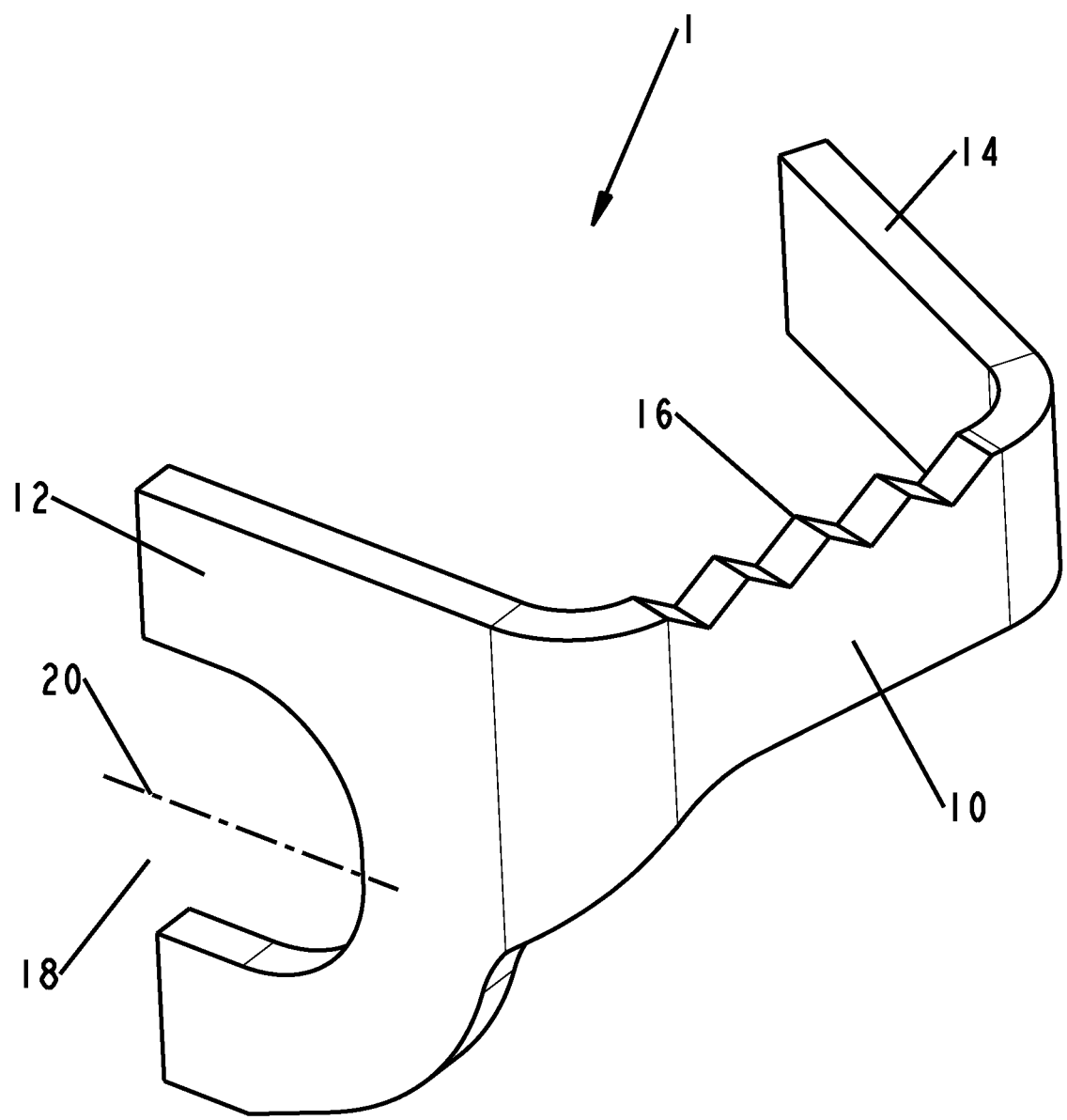
FIG. 1 is a perspective view of a combination tie down lug and step riser in accordance with the present invention.
Figure 2:
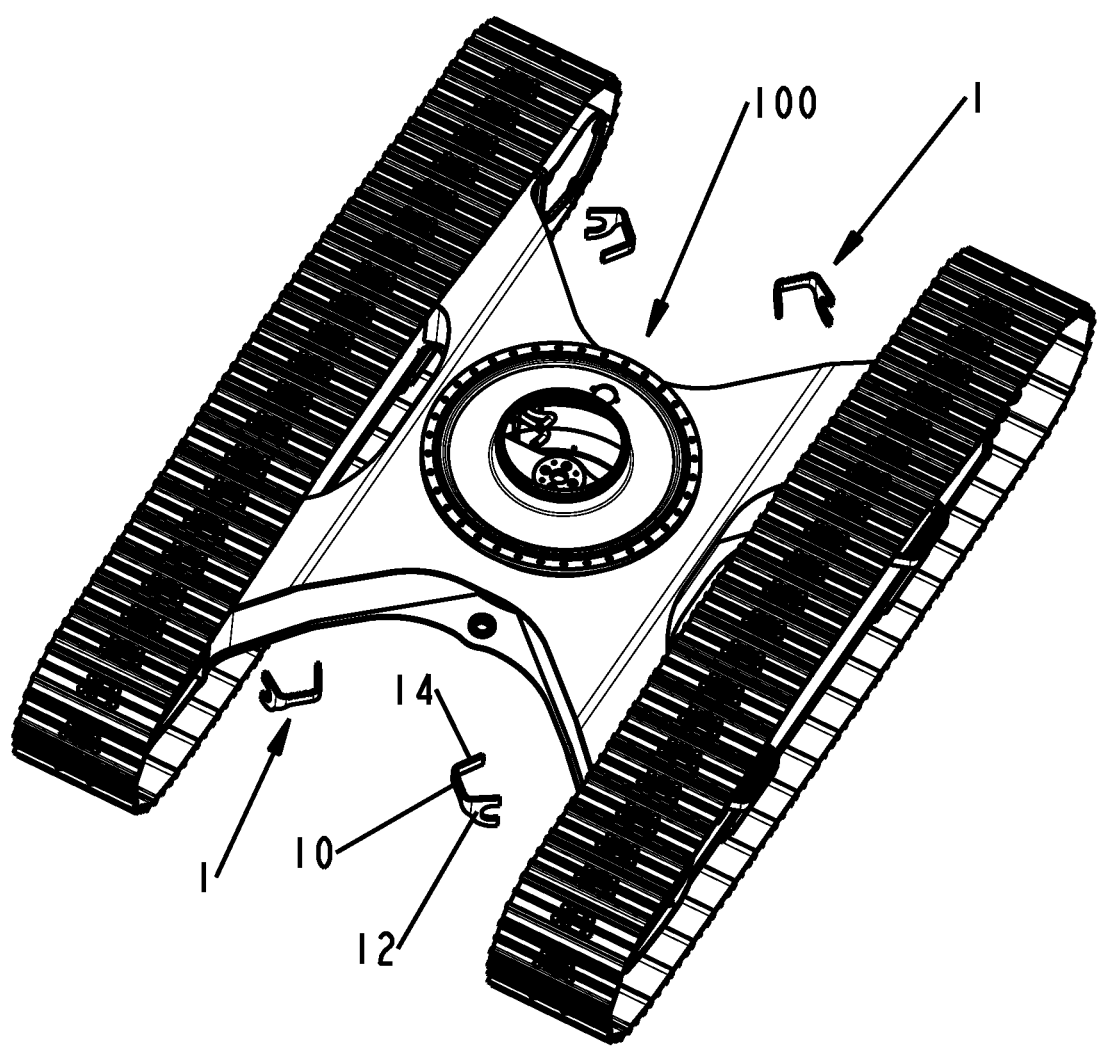
FIG. 2 is an exploded perspective view of a plurality of combination tie down lug and step risers before attachment to an excavator base in accordance with the present invention.
Figure 3:
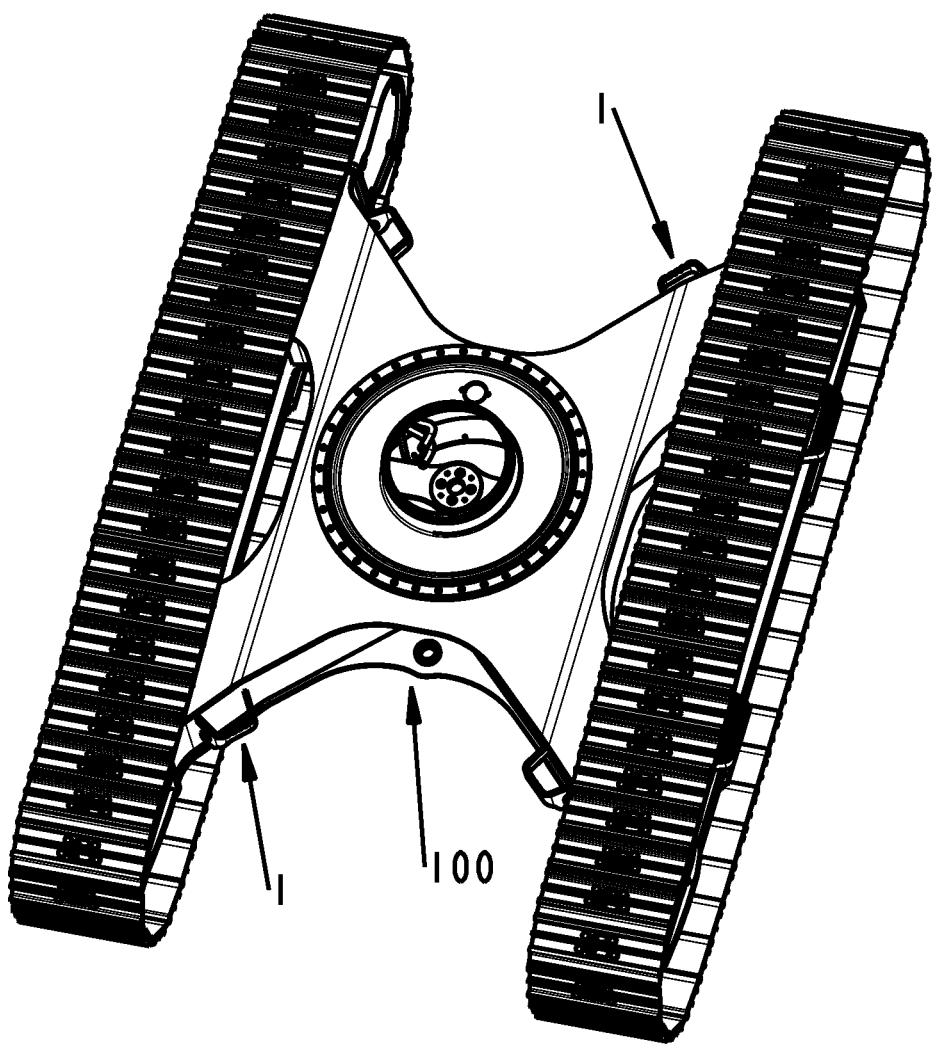
FIG. 3 is an exploded perspective view of a plurality of combination tie down lug and step risers after attachment to an excavator base in accordance with the present invention.
Figure 4:
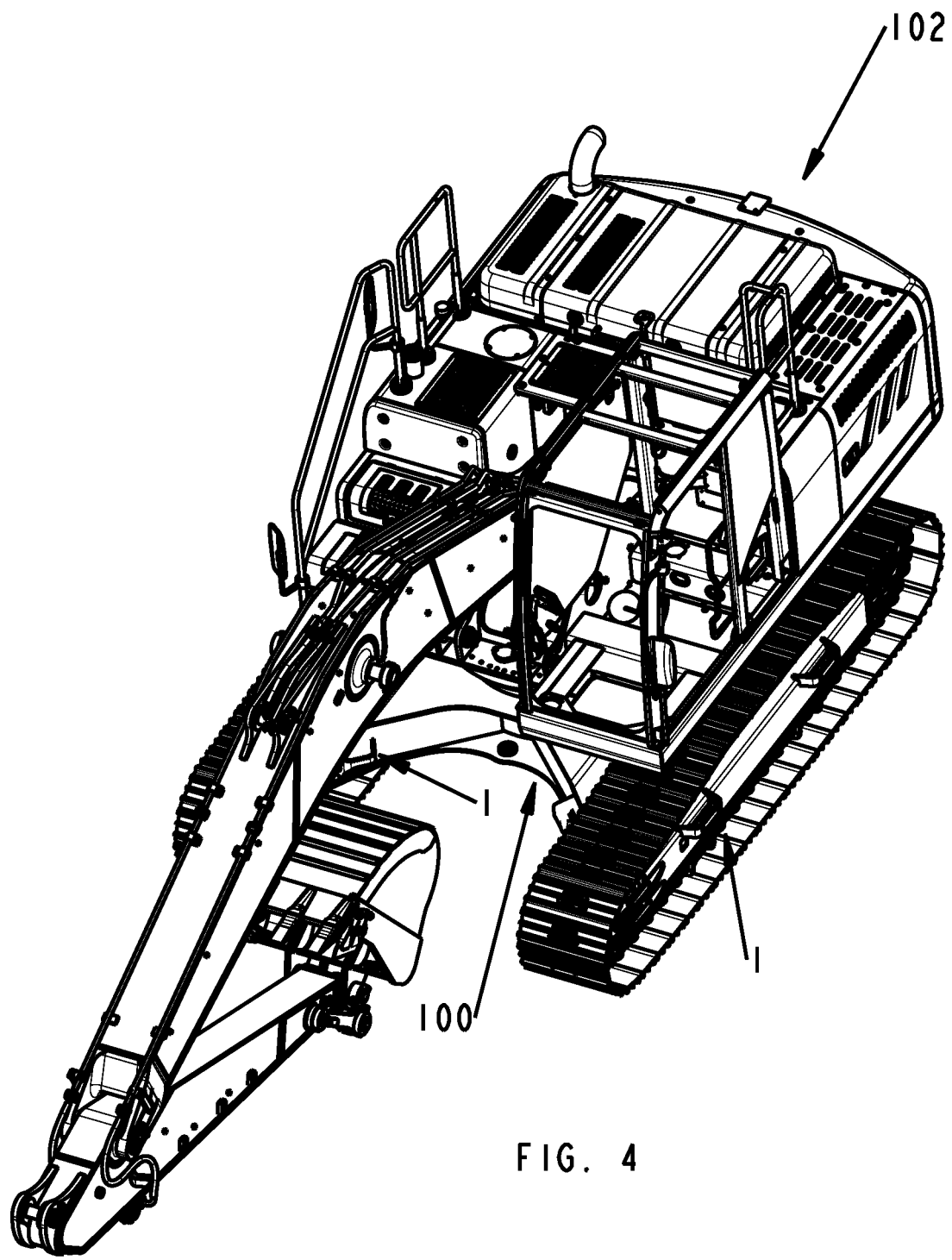
FIG. 4 is a perspective view of an excavator and a combination tie down lug and step riser in accordance with the present invention.

With reference now to the drawings, and particularly to FIG. 1, there is shown a perspective view of a combination tie down lug and step riser 1. The combination tie down lug and step riser 1 preferably includes a foot support portion 10, a hold down loop 12 and a mounting portion 14. The combination tie down lug and step riser 1 is preferably fabricated from a single piece of material. However, the combination tie down lug and step riser 1 may also be fabricated from multiple pieces of material. The foot support portion 10 includes a plurality of projections 16, such as a saw tooth pattern extending upward from a top edge of the foot support portion 10 to engage a shoe of an operator to prevent slippage during entry to the excavator cab or the like. The hold down loop 12 extends from one end of the foot rest portion 10. The hold down loop 12 includes a U-shaped opening 18 with the U-shaped opening 18 positioned along a horizontal axis 20. The mounting portion 14 extends from an opposing end of the foot support portion 10. With reference to FIGS. 2-3, opposing ends of the hold down loop 12 and the mounting portion 14 are attached to a piece of equipment, such as an excavator base 100 with welding or any other suitable attachment method. The closed opening formed by the U-shaped opening 18 and attachment to the excavator base 100 form a suitable hold down opening. A hold down cable, strap or the like is inserted through the hold down opening to secure the piece of equipment to a transport trailer. With reference to FIG. 4, an excavator 102 is mounted to the excavator base 100. The distance between the foot rest portion 10 and the excavator base 100 or the like is suitable for placement of a shoe for climbing into the excavator 102 or the like. The foot support portion 10 of the combination tie down lug and step riser 1 may be used to climb into the excavator cab when a side of the excavator cab is perpendicular to a track of the excavator base 100. With reference to FIG. 4, the combination tie down lug and step riser 1 may also be attached to a side of the track of the excavator 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A combination tie down lug and step riser comprising:
   a foot support portion;
   a hold down loop includes a U-shaped opening, said hold down loop extends from one end of said foot support; and
   a mounting portion extends from an opposing end of said foot support portion, wherein opposing ends of said combination tie down lug and step riser are attached to a piece of equipment.

2. The combination tie down lug and step riser of claim 1 wherein:
   said combination tie down lug is fabricated from a single piece of material.

3. A combination tie down lug and step riser comprising:
   a foot support portion;

a hold down loop includes a U-shaped opening, said U-shaped opening is positioned along a horizontal axis, said hold down loop extends from one end of said foot support; and a mounting portion extends from an opposing end of said foot support portion, wherein opposing ends of said combination tie down lug and step riser are attached to a piece of equipment.

4. The combination tie down lug and step riser of claim 3 wherein:

said combination tie down lug is fabricated from a single piece of material.

5. A combination tie down lug and step riser comprising:

a foot support portion includes a plurality of projections extending upward from a top edge thereof;

a hold down loop includes a U-shaped opening, said hold down loop extends from one end of said foot support; and a mounting portion extends from an opposing end of said foot support portion, wherein opposing ends of said combination tie down lug and step riser are attached to a piece of equipment.

6. The combination tie down lug and step riser of claim 5 wherein:

said U-shaped opening is positioned along a horizontal axis.

7. The combination tie down lug and step riser of claim 5 wherein:

said combination tie down lug is fabricated from a single piece of material.

8. The combination tie down lug and step riser of claim 5 wherein:

said plurality of projections form a saw tooth pattern.

* * * * *